Nov. 1, 1966  R. STEINBERG  3,282,035

MOLECULAR BEAM VELOCITY SELECTOR

Filed Dec. 30, 1963

INVENTORS
ROBERT STEINBERG

BY

*G. D. O'Brien*
*Norman T. Musial*
ATTORNEYS 3,282,035
MOLECULAR BEAM VELOCITY SELECTOR
Robert Steinberg, Berea, Ohio, assignor to the United States of America as represented by the Administrator of the National Aeronautics and Space Administration
Filed Dec. 30, 1963, Ser. No. 334,678
8 Claims. (Cl. 55—400)

The invention described herein may be manufactured and used by or for the Government of the United States of America for governmental purposes without the payment of any royalties thereon or therefor.

The present invention relates generally to molecular beam velocity selectors and, more particularly, to a molecular beam velocity selector which may be utilized for particles with velocities up to 40,000 meters/second.

Research in rarefied gas dynamics using molecular beam techniques have important applications to space technology since such investigations can aid in the determination of the variation of atmospheric conditions with altitude in the upper sections of the earth's atmosphere. For example, heretofore experimental data on the drag coefficients of spheres under the low density and high velocity conditions corresponding to earth satellite orbits was not available and it has been necessary to rely on theoretical predictions of sphere drag in order to arrive at atmospheric density values from satellite tracking data. It thus becomes necessary to check the theoretical drag coefficient data experimentally in order to place confidence in the density data which has been obtained from several satellites currently in orbit.

Molecular beam scattering experiments provide a powerful method for the investigation of the mechanism whereby the neutral molecules of a rarefied gas exchange momentum and energy during collision with a solid source. However, conventional molecular beam sources do not provide the larger molecular energies corresponding to satellite velocities. Consequently, it is required that beams be produced by the electrostatic acceleration of ions. Unfortunately, space charge difficulties limit the attainable beam intensity at low energy. Nevertheless, the neutralized ion molecular beam source appears to be an attractive method of evaluating experimentally the aerodynamic drag on a solid surface subjected to the environment corresponding to a satellite orbit.

Neutralization of the ion beam by charge exchange in the parent gas can be accomplished either by passing the beam through a differentially pumped gas cell or by crossing the ion beam with a jet of the parent gas. The use of the gas jet method of beam neutralization while maintaining a low pressure in the vicinity of the test surface requires large pumping speeds relative to the gas cell method. As a consequence, this method is less attractive than the gas cell method, however, the gas cell method presents a problem as a result of the gas emerging from the exit aperture along with the neutralized beam. The force on the test surface due to these slow moving gas molecules can easily be larger than the force due to the molecular beam itself. One method of greatly reducing this background force is the use of a mechanical chopper to discriminate against the slow gas molecules from the gas cell relative to the faster beam molecules.

Accordingly, it is an object of this invention to provide a mechanical separation and discrimination apparatus for molecular particles.

It is an additional object of this invention to provide a molecular beam velocity selector capable of selecting particles of very high velocities.

It is still a further object of this invention to provide an improved velocity selector having extremely high resolution characteristics.

A more complete appreciation of the invention and many attendant advantages thereof will be more readily appreciated as the same becomes better understood by reference to the following detailed description when considered in connection with the accompanying drawing wherein.

According to the present invention, the foregoing and other objects are obtained by the provision of a novel molecular beam velocity discriminator. The selector is mounted on a vertical axis and utilizes a tapered disk to permit extremely high rotational speed and at the same time to offer an extremely stable configuration. Longitudinal slots disposed in the disk provide passage for the accelerated particles while discriminating against the slower moving particles. The disk is, advantageously, made of aluminum or titanium (depending on required operational speed) to provide a high strength to weight ratio and a stable base upon which the slots are formed. The slots are produced by an electrical discharge machine so as to insure minimum slot width and close spacing for good resolution. The selector disk is rotatably mounted in a lower bearing formed by a pin riding in a cup-like depression and is vertically held in this position by an upper bearing assembly formed by the centering of a pair of magnets one being fixed to the disk and the other dampeningly suspended from a fixed support. Rotation is imparted to the particle selector by a circular plate fixed to the tapered disk and magnetically coupled to the windings of an electric motor.

Figure 1:
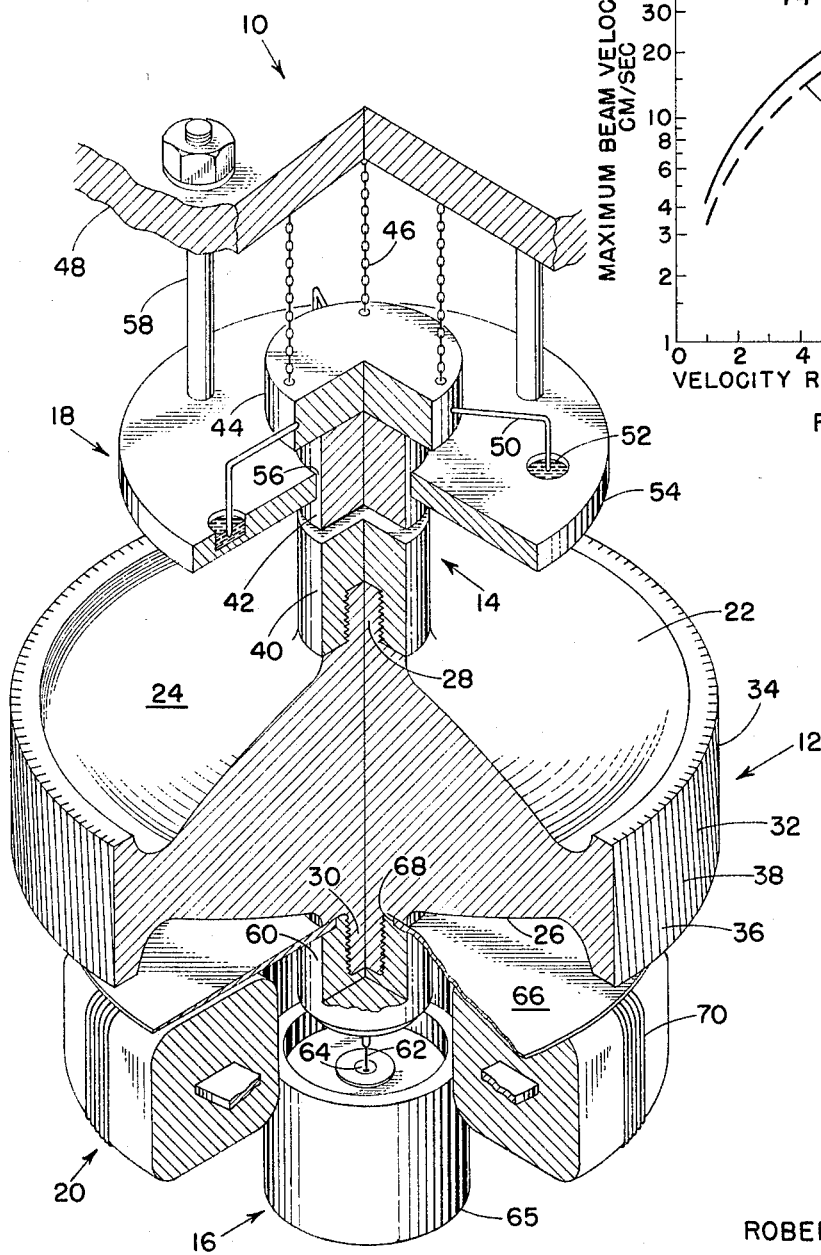
FIG. 1 is an elevation view partly in section of the molecular beam velocity selector with the selector cover removed.

Referring now to FIG. 1, there is shown the novel molecular particle discriminator which forms the instant invention. The discriminator is indicated, generally, by the numeral 10 and includes a velocity selector subassembly 12 amounted for rotation in a vertical plane by upper and lower bearing subassemblies 14 and 16, respectively. A damping mechanism 18 is disposed above the upper bearing assembly and is provided to prevent vibration at resonance, while a drive system 20 rotatably drives the discriminator disk assembly.

The selector subassembly 12 comprises a disk 22 having tapered upper and lower faces 24, 26 to insure dimensional stability at the extremely high speeds at which the disk rotates (up to 125,000 r.p.m.). Either aluminum or titanium may be utilized in forming this disk, both being satisfactory materials for this purpose since they exhibit a high strength to weight ratio and are stable and thus capable of having closely space slots formed therein. Integral with the upper face of the disk, an upper stub 28 is provided for connection of the upper bearing assembly. Similarly, a lower stub 30 is provided in the bottom face of the disk for attachment of the lower bearing assembly.

Helical slots 32, formed in the rim or periphery 34 of the disk 22 provide passage for the higher velocity molecular particles while at the same time preventing passage of low velocity molecules. These slots are defined by land portions 36 and depressed, groove portions 38 situated around the rim 34 of the disk. Although these slots may be formed by carefully controlled sawing by, for example, a circular saw, the slots formed by this method must have rather large separations or land portions between them, thereby reducing selector transmission. A much preferred method of slot formation is accomplished by the use of an electric discharge machine. The slots formed by this method are on the order of $8.89 \times 10^{-3}$ cm. wide, with the space between slots being on the same order since the electrode which forms the slot never comes in contact with the slot wall and therefore does not prestress the disk material. Because of the narrow slot width, high resolution is obtained and, additionally, the rougher slot formed by an electric discharge machine advantageously also provides a rougher slot surface which reduces wall scattering problems.

Fixedly attached to the upper stub 28 is a permanent magnet 40 which forms a part of the upper bearing assembly. This portion of the bearing assembly centers on an upper magnet 42 suspended thereabove to provide, as the disk rotates, a non-engaging mating surface therebetween allowing magnet 40 and the attached tapered disk to floatably rotate at the upper bearing with only the magnetic force between the two magnets attracting, centering, and partially suspending the tapered disk.

Mounting the upper magnet 42 is a circular disk 44, this disk forming a portion of the upper bearing assembly and also providing an attachment area for the beaded chains 46, 46, 46, disposed at 120° angular spacing around the disk. The upper ends of these chains are attached to the cover 48 of the selector (shown only fragmentarily) to again insure free centering of the magnets 40, 42 and also to provide a slight damping force for the upper bearing assembly 14. The cover, of course, provides a vacuum tight shell and a shrapnel retainer in the event of disk failure.

The damping mechanism 18 is also attached to the disk 44 and consists of three right-angled arms 50, which are arranged in depending relation therefrom to extend into oil filled perforated portions 52 of a damping plate 54. The damping plate 54 is fixed to and supported from the cover 48 in any convenient manner such as by studs 58, and is provided with a bore 56 which, as can be easily seen in FIG. 1, prevents interference with the upper bearing assembly 14.

Beneath the tapered disk the lower bearing assembly 16 is disposed, it includes needle carrying bushing 60 attached to the lower stub 30 by threads or the like, a needle bearing 62 and cup-like bearing race 64 disposed on lower bearing member 65. The needle bearing 62 is fixedly attached to the bushing 60 to depend into and contact the bearing race 64 to provide a bearing having very low friction losses. The lower bearing member 65 is supported by any convenient connection (not shown) attached to or integral with the cover.

Tapered disk 22 is capable of being driven at very high rotational speeds by a hardened steel, drive plate 66 which is held rigid with the tapered and slotted disk 22 by shoulder 68 on bushing 60. Magnetically coupled to this plate is the drive coil 70 which is the field coil of a three-phase motor (not shown), the drive coil inducing eddy currents in the drive plate to cause the velocity selector to rotate at high speed.

In operation, the upper and lower bearing assemblies 14, 16 in conjunction with the damping mechanism 18 permits extremely high selector rotational speeds without excess vibration. Because of this vibrationless motion the tapered disk 22 may be operated near the yield point of the material from which it is formed to permit discrimination of molecules of the higher velocities.

To select molecules of a particular velocity, the molecular beam source is directed at the bottom face of the tapered disk. The velocity of the molecules successfully traversing the slots 32 is given by the expression $$V_m = \frac{wL}{\phi}$$

where $w$ is the angular velocity of the rotor and $\phi$ is the angle through which the rotor turns while a particle travels the length L of the slot 32. It should be obvious that high rotational speed is required for the extended range particles unless resort is had to selectors of extreme and cumbersome length.

Figure 2:
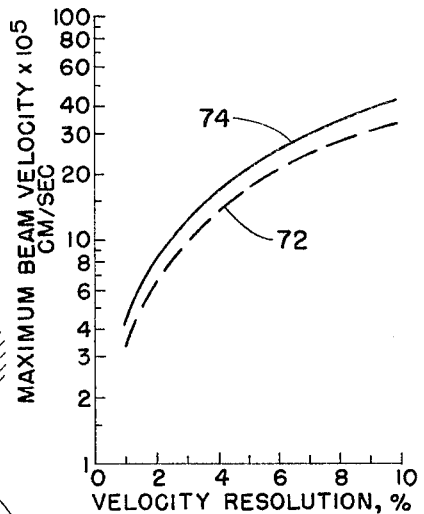
FIG. 2 is a curve of maximum velocity of transmitted beam as a function of velocity resolution.

The instant invention is capable of a peripheral velocity of 800 m./sec. (100,000 r.p.m.) when an aluminum selector disk is utilized and 1,000 m./sec. (125,000 r.p.m.) when a titanium disk is utilized. Turning to FIG. 2, it can be seen that extremely good velocity resolution is obtained with either disk material, the numerals 72, 74 indicating the characteristics of aluminum and titanium material disks, respectively. The percent velocity resolution (abscissa) extends from about 1–10% (dependent on beam velocity) and indicates the relative measure of non-uniform velocity particles passing through the selector in relation to the number of uniform velocity particles.

While a preferred embodiment of the invention has been disclosed and described, it will be appreciated that various modifications may be made to the disclosed structure without departing from the spirit of the invention or the scope of the subjoined claims. For example, the helical slots 22 may be replaced by straight slots where a very small helical angle is required for resolution and then the molecular beam source inclined at this angle relative to the rotational axis of the discriminator.

What is claimed is:

1. A molecular beam velocity selector comprising: a vertically supported disk having tapered upper and lower faces and an outer rim composed of longitudinally extending land and groove portions whereby said disk has optimum dimensional stability at high rotational speeds; a first permanent magnet attached to the upper face of said disk; a second permanent magnet dampingly suspended above said first permanent magnet; a needle-like pin bearing extending outwardly from the lower face of said disk; a cup-like bearing surface disposed beneath said pin bearing; and driving means attached to said disk for driving the same at extremely high rotational speeds.

2. Apparatus for selecting particles of predetermined high velocities up to 40,000 meters per second emanating from a source while discriminating against particles having other velocities comprising:
   a discriminator of a rigid material comprising a disk having tapered upper and lower faces to insure dimensional stability at high rotational speeds between 100,000 r.p.m. and 125,000 r.p.m., said disk having a plurality of longitudinally extending slots spaced about the periphery thereof to provide passages for accelerated particles from the source,
   drive means for rotating said discriminator so that particles having a predetermined velocity pass through said slots while particles having other velocities impinge on the sides of said slots, and
   means for mounting said discriminator for rotation about a vertical axis thereby enabling said drive means to rotate said discriminator at extremely high rotational speeds with a minimum of vibration near the yield point of said rigid material.

3. Apparatus as claimed in claim 2 wherein the discriminator comprises a lightweight metal disk providing a high strength to weight ratio and a stable base for the slots.

4. Apparatus as claimed in claim 3 wherein the discriminator comprises an aluminum disk, and
   the drive means includes a magnetic coupling for rotating said aluminum disk at about 100,000 revolutions per minute whereby the peripheral velocity of the discriminator at the slots is about 800 meters per second.

5. Apparatus as claimed in claim 3 wherein the discriminator comprises a titanium disk, and
   the drive means includes a magnetic coupling for rotating said titanium disk at about 125,000 revolutions per minute whereby the peripheral velocity of the discriminator at the slots is about 1000 meters per second.

6. Apparatus as claimed in claim 2 wherein the drive means comprises,
an electric motor having a field coil,
a drive plate rigidly secured to the discriminator and magnetically coupled to said field coil whereby eddy currents induced by said field coil in said drive plate rotates said discriminator at high speeds.

7. Apparatus as claimed in claim 2 wherein each of the longitudinally extending slots about the periphery of the discriminator have a helical configuration formed by an electrical discharge machine thereby insuring minimum slot width and close spacing for good resolution and a relatively rough surface to reduce wall scattering.

8. Apparatus as claimed in claim 7 wherein each of the helical slots have a width of about $8.89 \times 10^{-3}$ centimeters and the spacing between said slots is substantially the same as the width of said slots for high resolution.

References Cited by the Examiner

UNITED STATES PATENTS

| | | | |
|---|---|---|---|
| 1,700,928 | 2/1929 | Fawkes | 55—17 X |
| 3,097,167 | 7/1963 | Beyerle | 233—23 |
| 3,216,655 | 11/1965 | Wind et al. | 233—27 |
| 3,219,265 | 11/1965 | Los et al. | 233—27 |

FOREIGN PATENTS

| | | |
|---|---|---|
| 1,293,838 | 4/1962 | France. |
| 985,668 | 3/1965 | Great Britain. |

OTHER REFERENCES

Hostettler, H. U., et al.: "Improved Slotted Disk Type Velocity Selector for Molecular Beams." The Review of Scientific Instruments, vol. 31, number 8, pp. 872–877, August 1960.

Miller, R. C., et al.: "Velocity Distributions in Potassium and Thallium Atomic Beams." Physical Review, vol. 99, number 4, pp. 1314–1321, August 15, 1955.

ROBERT F. BURNETT, *Primary Examiner.*